April 16, 1963   O. SLOAN ET AL   3,085,476
CUTTING TOOL FOR SPHERICAL SURFACES
Filed July 1, 1959
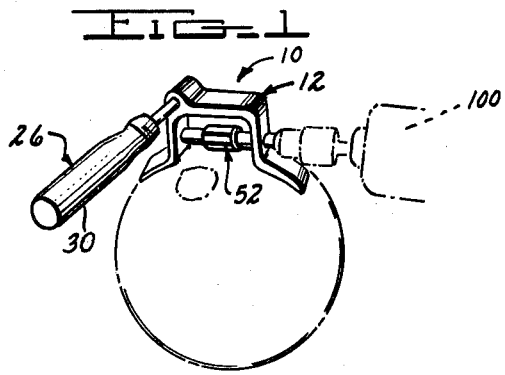
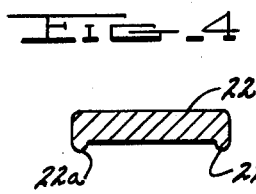
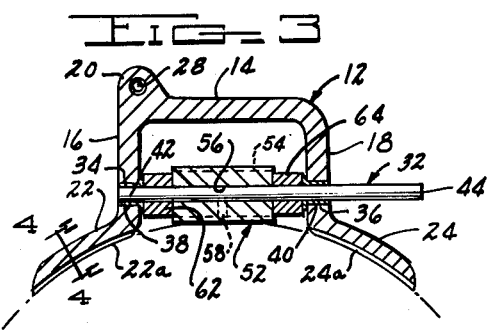
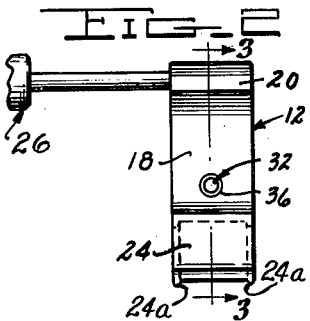
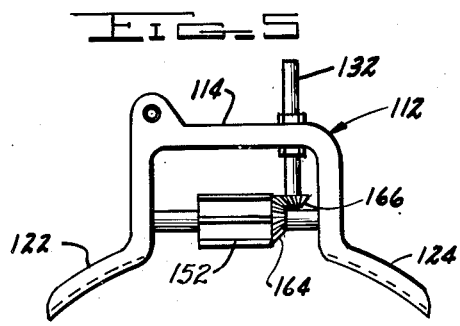
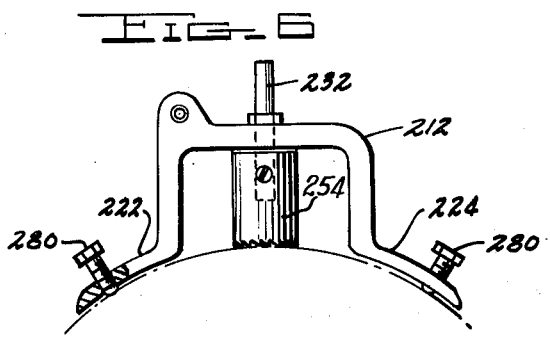
INVENTORS
OTTO SLOAN
FRANK SKERBINC
KOTTS & SHERIDAN
ATTORNEYS 3,085,476
CUTTING TOOL FOR SPHERICAL SURFACES
Otto Sloan, 21710 Lyndon, Allen Park, Mich., and Frank Skerbinc, 17300 Keppen Road, Detroit, Mich.
Filed July 1, 1959, Ser. No. 824,399
3 Claims. (Cl. 90—12)

The present invention relates to new and useful improvements in tools and more particularly to a tool used for machining the outside spherical surface of a plugged bowling ball.

The tool of the present invention was developed because of the need for a relatively inexpensive means for resurfacing the outside spherical surface of a plugged bowling ball. Frequently after a bowling ball has been used for some time, the owner of the ball decides some modification of the drilled holes is required. To accomplish this modification, the existing finger holes are plugged and redrilled.

In the past, bowling balls have been plugged by use of a machined insert cemented into an enlarged opening turned in a lathe. The ball is positioned in a lathe fixture and an opening turned which is concentric with the finger holes. The machined insert is then cemented into each of the openings.

This turning method of plugging has become obsolete with the introduction of a new plastic material which is placed directly in the finger holes. After the plastic material has set, the outer spherical surface is reworked by hand. While the new plastic plug and hand reworking represent an advance in the art and a substantial saving of equipment expenditure, the use of the present invention in combination with the plastic plug represents a still further advance and an additional saving. The time consumed in hand reworking is reduced by approximately seventy-five percent in addition to the fact that no lathe work or lathe hand is required.

It is therefore an object of the present invention to provide a simple tool which will increase the productivity of persons engaged in the business of reworking and drilling bowling balls.

Another object of this invention is the provision of a tool which is not only simple, but one which can be operated by non-skilled help.

Still another object of the present invention is the provision of a tool which will substantially reduce the investment required to get into the business of reworking and redrilling bowling balls.

Another object of the present invention is the provision of a tool that is simple, durable and which can be manufactured by modern mass production methods.

These and other objects can be accomplished by the provision of a cutting tool having an inverted, generally U-shaped frame support means of uniform width; a handle extension on said frame support means; radial extensions depending from the ends of said U-shaped frame section and adapted for engagement with a spherical surface; a centrally located drive shaft horizontally positioned between the sidewalls of said frame means; one end of said drive shaft extending beyond said frame support means and cooperable with a driving means; sleeve bearings journaled in said frame support; a cutter having a plurality of blades, horizontally mounted on said drive shaft; a spacer positioned intermediate each end of the cutter and sidewalls of said frame support; movement of said cutter over the spherical surface of a bowling ball removing any irregularities caused by plugging.

Other objects of this invention will appear in the following description and appended claims, reference being had to the accompanying drawings forming a part of this specification wherein like reference characters designate corresponding parts in the several views.

In the drawings:
FIG. 1 is a perspective view of the tool of the present invention, the bowling ball and driving means shown in phantom.
FIG. 2 is a side view of FIG. 1.
FIG. 3 is a cross sectional view taken on lines 3—3 of FIG. 2.
FIG. 4 is a cross sectional view taken on lines 4—4 of FIG. 3.
FIG. 5 is an elevational view of a modified form of the present invention.
FIG. 6 is another modified form of the present invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings, FIG. 1 illustrates the tool 10 of the present invention. The tool is comprised of four basic parts, namely the frame 12, handle 26, drive shaft 32 and cutter 52.

The frame 12 (FIGS. 1 and 3) is of generally U-shaped construction. The top portion 14 of the frame 12 is substantially flat with sidewalls 16 and 18 extending downwardly at right angles thereto. Both sidewalls 16 and 18 are in generally parallel relationship. Integral with the sidewalls 16 and 18 and extending outwardly therefrom are foot members 22 and 24. A boss 20 extends above the substantially flat top portion 14 and intersects the sidewall 16. The complete frame 12 is of generally uniform width throughout. The underside of both foot members 22 and 24 have a pair of downwardly depending flanges 22a and 24a on the outside edges thereof (FIG. 4), to form a spherical contact surface. Should flanges 22a and 24a be removed, the underside of both members 22 and 24 would be spherical in shape for the same reason.

The handle 26 (FIG. 1) is threaded on one end so as to engage a threaded opening 28 in the boss 20 while the other end forms the grip means 30.

The drive shaft 32 (FIG. 3) is round in shape and extends horizontally thru two aligned bearing openings 34 and 36 located in sidewalls 16 and 18. The bearings 38 and 40 are of the (oilite) sleeve type and journal the drive shaft 32. End 42 of drive shaft 32 terminates at the outside face of sidewall 16. End 44 of shaft 32 extends beyond sidewall 18 and is adapted to have the driving means 100 (FIG. 1) secured thereto. The driving means is an electric drill of the hand type.

The cutter 52 (FIG. 3) has a plurality of rectangularly shaped blades 54 on the periphery thereof. Each blade extends in a longitudinal direction parallel with the axis of rotation. An axial opening 56 extends thru the center of the cutter to receive the drive shaft 32. The cutter 52 is positioned on shaft 32 between two spacer sleeves 62 and 64 and locked to the drive shaft 32 with a set screw 58. One end of each spacer engaging the inside surfaces of the sidewalls 16 and 18 while the other ends of the spacers engage the outside ends of the cutter 52. The cutter is positoned so as to form a spherical surface when the extensions engage the ball.

FIG. 2 of the drawing shows the relative central position of the drive shaft 32, while FIGS. 5 and 6 show modified forms of the present invention.

FIG. 5 illustrates a modified form of the present invention wherein a right angled cutter drive is employed. The frame member 112 is of the same general U configuration as the frame in the preferred form of the invention, with a few exceptions. The spacer sleeve 64 is replaced by a bevel gear 164. A second bevel gear 166 engages the first bevel gear 164 while the drive shaft extends at right angles through the top 114 of the frame 112. However, the same might be accomplished by the provision of a vertically disposed end mill cutter centrally positioned in the frame 112 at right angles to the bowling ball.

FIG. 6 illustrates a second modified form of the present invention, wherein the foot members 222 and 224 may be adjusted for vertical height. This adjustment is accomplished by the provision of a single screw 280 in each of the foot or pads members 222 and 224. The ends of the screw 280 are round and adapted to be turned out or otherwise backed off for adjustment. Adjustment is required only when the cutter is sharpened. Since the cutters in all of the above mentioned tools are made of carboloy or other similar material, sharpening is held to a minimum, although when required, offers no problem.

*Operation*

After a bowling ball has been plugged and the plastic material has had sufficient time to set, the tool of the present invention is used. An electric drill 100 is cooperatively secured to the drive shaft 32. The foot members 22 and 24 of the frame 12 are brought into engagement with the spherical surface of the ball. The electric drill motor 100 is started and the cutter moved about the surface of the ball. The cutter is accurately positioned in the frame 12, so that it will cut only the excess material from the plastic plug. After the excess material is cut from the ball, a small amount of hand finishing makes the ball ready for the redrilling.

From the foregoing description, it will be apparent to one skilled in the art that the present invention is simple, inexpensive and durable. It can be efficiently operated by non-skilled help and will provide maximum quality work with a minimum of expense.

Having thus described our invention, we claim:

1. In a device for resurfacing a partially irregular surface, the combination of, an inverted, generally U-shaped frame support means of uniform width; radial extensions depending downwardly and outwardly from the ends of said U-shaped frame section; a pair of spaced ribs depending downwardly and in substantially parallel relationship to the outside bottom radial edges of said extensions and adapted for engagement with a generally smooth spherical surface; a drive shaft horizontally positioned between the sidewalls of said inverted U-shaped frame support means; one end of said drive shaft extending beyond said frame support means and cooperable with a driving means; a cylindrical cutter horizontally mounted on said drive shaft intermediate said sidewalls and adapted to tangentially engage the irregular portion of said spherical surface; movement of the assembly about the smooth spherical surface causing said cutter to remove any irregularities from the partially irregular surface.

2. In a device for resurfacing the irregular surface of a plugged bowling ball, the combination of, an inverted, generally U-shaped frame support means of uniform width; a handle extension at generally right angles to said frame support means; radial extensions depending from the end of said U-shaped frame section and adapted for engagement with a generally smooth spherical surface; a centrally located drive shaft horizontally positioned between the sidewalls of said frame means; one end of said drive shaft extending beyond said frame support means and cooperable with a driving means; sleeve bearings journaled in said frame support and cooperative with said drive shaft; a cylindrical cutter having a plurality of blades, horizontally mounted on said drive shaft between the sidewall of said frame and adapted to tangentially engage the irregular spherical surface; a spacer positioned intermediate each end of the cutter and sidewalls of said frame support to center said cutter and provide a thrust bearing; movement of the assembly over the generally smooth spherical surface of a bowling ball causing the cutter to remove any excess material remaining as a result of plugging.

3. A device as in claim 2 wherein the radial extensions are adjustably adapted to engage a smooth spherical surface.

References Cited in the file of this patent
UNITED STATES PATENTS

| | | |
|---|---|---|
| 990,722 | Freeman | Apr. 25, 1911 |
| 1,116,158 | Swain et al. | Nov. 3, 1914 |
| 1,359,288 | Swain et al. | Nov. 16, 1920 |
| 1,560,034 | Brewer | Nov. 3, 1925 |
| 1,581,720 | Carter | Apr. 20, 1926 |